July 17, 1962 H. E. BACHER ET AL 3,044,163
METHOD OF SECURING A FITTING TO A REINFORCED HOSE
Original Filed Oct. 11, 1955 2 Sheets-Sheet 1
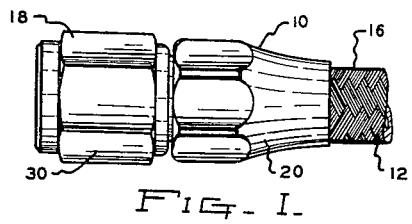
FIG. I.
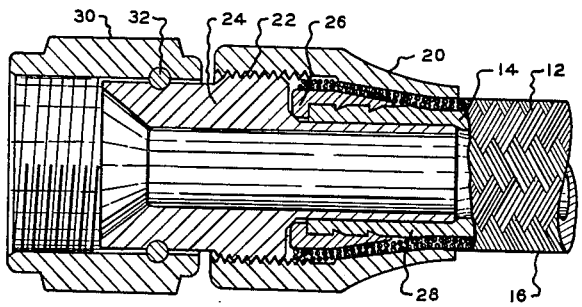
FIG. II.
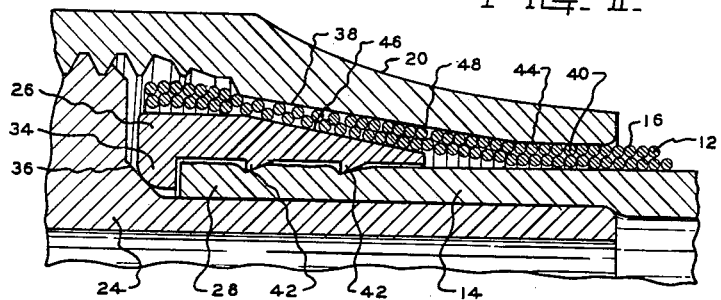
FIG. III.
INVENTORS
Hans E. Bacher
Roger P. La Marre
BY Beaman & Beaman
ATTORNEY

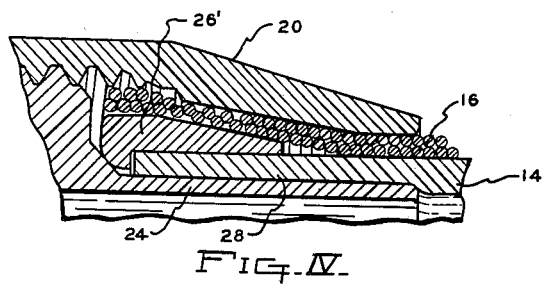
FIG. IV.
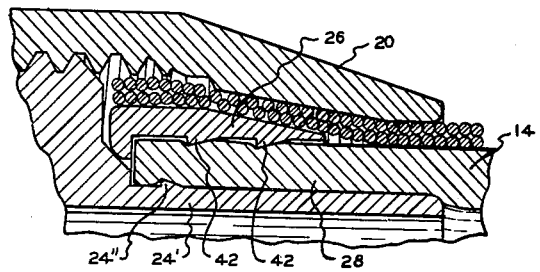
FIG. V.

United States Patent Office 3,044,163
Patented July 17, 1962

3,044,163
METHOD OF SECURING A FITTING TO A REINFORCED HOSE
Hans E. Bacher, Stuttgart Degerloch, Germany, and Roger R. La Marre, Jackson, Mich., assignors to Aeroquip Corporation, Jackson, Mich., a corporation of Michigan
Original application Oct. 11, 1955, Ser. No. 539,831, now Patent No. 2,833,567, dated May 6, 1958. Divided and this application Apr. 28, 1958, Ser. No. 731,220
2 Claims. (Cl. 29—506)

The present application is a division of application Serial No. 539,831, filed October 11, 1955, now Patent Number 2,833,567, and relates to a method of manipulation and embracement of the inner tube of the hose construction disposed within an end fitting as to enable the fitting to have optimum performance capacity when applied to hose construction having an inner tube of low elastic material such as polymerized tetrafluoroethylene, nylon and similar materials.

In the designing of end fittings for flexible hose lines, the fitting is considered to perform satisfactorily in service or upon testing if it is capable of forming a leak proof connection with the hose and have a performance capacity in excess of that of the hose itself inwardly from the fitting. Thus, a fitting which has performance capacity in excess of that of the hose to which it is attached with the result that failure of the hose preceeds failure of the fitting, the fitting may be described as having "optimum performance capacity" with respect to the hose construction to which it is attached.

During the period the elastomer material from which the inner tube of the hose construction retains its original elasticity and degree of softness (hereinafter characterized as green) compression type fittings may be readily designed with optimum performance capacity. However, upon aging, especially under conditions of high or low temperatures maintained for extended periods, the original forces of compression between the fitting and the hose end will gradually diminish to the point that leakage will ultimately take place in the fitting well within performance capacity of the hose construction itself inwardly of the fitting. As disclosed in Patent 2,731,279 a fitting structure has been proposed in which all forces of compression have been eliminated from a portion of the inner tube confined within the fitting and providing an annular lip seal portion. This annular lip seal portion is designed to be actuated by fluid pressure into pressure sealing relation with the annular wall of an intermediate member disposed between the nipple and the socket. In practice it has been found that the fitting construction of said patent will have optimum performance capacity when used with a hose having an elastomer inner tube under most all conditions of use and aging with leagage occurring only in the event the annular lip seal portion hardens and/or stiffens to the extent that the available fluid pressure is inadequate to actuate the lip seal portion into fluid sealing position with respect to the embracing intermediate member.

For the same reason the fitting of said patent may develop leakage upon appreciable hardening or stiffening of the elastomer material forming the annular lip seal portion, leakage may also be experienced under conditions of low pressure when this type of fitting is applied to a hose construction having an inner tube of plastomer material of sufficiently low elasticity and/or having a degree of stiffness which will prevent the development of fluid pressure sealing of the annular lip sealing portion. Inner tubes of polymerized tetrafluoroethylene, nylon, elastomers stiffened by compounding such as with synthetic resins and numerous thermoplastic tube stocks now available for use in flexible hose lines and herein defined as a group of plastomers necessitate a modification of the fitting structure of said patent to achieve a fitting having optimum performance capacity.

In carrying out the method of the present invention we have provided an improved fitting over the type described in said patent whereby the present invention is capable of giving optimum performance capacity with elastomer inner tube stock green or fully aged as well as with inner tube stock of relatively low elasticity, and/or of a relatively stiff or hard structure as compared with normal elastomer material. This has been accomplished in the present invention in detachable, reuseable fittings as well as permanently applied fittings, by so designing the structure embracing the annular lip seal portion as to position and maintain the lip seal portion in such contiguous relationship to the surface or surfaces against which it is actuated by the fluid pressure as to assure the development of an adequate initial seal whereby the fluid pressure carried by the inner tube is available for the actuation of the lip seal portion.

In one of the illustrated forms of the invention, the assembly and maintenance advantages of the detachable, reuseable, manually assembled type of fitting disclosed in Patent No. 2,219,266 is accomplished through the provision of a sleeve which embraces the annular lip seal portion of the inner tube disposed upon the nipple of the fitting. More specifically, a detachable, reuseable, fitting is shown in which a separate sleeve has a metal-to-metal seal with the nipple and embraces the annular lip seal portion of the inner tube; the interior surface of the sleeve having initial seal producing compressive engagement with the outer surface of the lip seal portion.

In another illustrated form, the principles of the invention, although particularly designed for detachable, reuseable fittings, is shown embodied into a permanently applied type of fitting of a swaged-on construction.

Thus an object of the invention resides in the method of manipulation and embracement of the inner tube of the hose construction disposed within an end fitting as to enable the fitting to have optimum performance capacity when applied to hose construction having an inner tube of low elastic material such as polymerized tetrafluoroethylene, nylon and similar materials.

Another object of the invention resides in a method of manipulation and embracement of the inner tube of a flexible hose construction having a fitting assembly attached to one end of the hose, the inner tube being of a deformable material of the class of elastomers and plastomers which are incapable of sustaining forces of compression of fluid sealing magnitude under conditions of use and ageing.

Further objects and advantages of the invention will hereinafter appear from the following specification and claims.

In the drawings,

FIG. 1 is an elevational view of a flexible hose line assembly having a fitting applied to one end thereof, FIG. 2 is an enlarged fragmentary view of FIG. 1 partly shown in cross section, FIG. 3 is an enlargement of a structural detail of FIG. 2, and FIGS. 4, and 5 are views similar to FIG. 2 of modified forms of the invention.

Referring to the illustrated forms of fittings in which the method of the present invention is embodied, the hose line assembly 10 comprises a flexible hose 12 having an inner tube 14 and a reinforcing structure for the tube in the form of braided wire 16. The end fitting 18 is of a detachable, reuseable type and comprises a socket 20 for threaded engagement at 22 with the nipple 24. A sealing sleeve 26 is shown embracing the terminal end of the inner tube 14 herein called the lip seal portion 28. A nut 30 is attached to the nipple 24 by a suitable connector 32.

While it is to be understood that the present invention has general application to flexible hose construction materials heretofore in wide use, it is especially adapted to the effective sealing of hose construction having an inner tube of relatively stiff and low elastic material, as for example, such materials as polymerized tetrafluoroethylene. Also it is to be understood that the sealing function and characteristics of the sleeve 26 are not restricted to detachable, reuseable fittings for the reason that the sleeve 26 may be used, for example, with nipple and socket structure of the swaged-on permanent type.

In view of the fact that the present invention resulted principally from an attempt to solve the problem of developing a satisfactory end fitting for wire braided hose having a satisfactory tetrafluoroethylene inner tube, the specific disclosure of the invention hereinafter appearing will be described with respect to the application of the invention to such a hose construction.

Accordingly, the hose 12 comprises an inner tube 14 of polymerized tetrafluoroethylene material which is furnished at the present time by the E. I. du Pont de Nemours and Company under the trademark "Teflon." Wire braid 16 is then applied to the inner tube 14 by the hose manufacturer to complete the fabrication of the hose structure. Because of the difficulties which have been experienced to date in providing a satisfactory bond between the "Teflon" inner tubing 14 and the wire braid 16, the reduction to practice of the present invention was carried out upon a hose 12 having the inner tube 14 unbonded to the wire braid 16. While this fact facilitates the insertion of the sealing sleeve 26 between the wire braid 16 and the outer surface of the inner tube 14, the bonding of the wire braid 16 to the inner tube 14 is anticipated and will only necessitate the destruction of the bonding at the locality of insertion of the sleeve 26.

The hose 12 in the assembly illustrated is first cut to length and is then inserted into the socket 20, the latter being slid inwardly from the cut end of the hose. Next the nippel 24 is inserted into the portion of the inner tube 14 to loosen the wire braid 16 adjacent the end of the hose 12 to facilitate the insertion of the sleeve 26. After loosening the wire braid 16 the nipple 24 is withdrawn from the bore of the inner tube 14 and the sleeve 26 is manually inserted between the wire braid 16 and the inner tube 14 to assume the position shown in FIG. 2. Thereafter the nipple 24 with the sleeve 26 embracing the end 28 is reinserted into the bore of the tube 14 and the socket 20 is slid along the hose 12 until threaded engagement can take place at 22 between the socket 20 and nipple 24 upon relative rotation.

After the nipple 24 is screwed into the socket 20, the forces developed by this assembly bring the rounded external annular shoulder 34 of the sleeve 26 into fluid sealing contact with the conical surface 36 of the nipple 24. At the same time, the wire braid 16 is wedged at 38 between the sleeve 26 and the socket 20 and firmly clamped. Compression of the hose 12 at 40 between the nipple 24 and the socket 20 will also take place upon assembly as just described for reasons hereinafter appearing.

With the inner tube 14 of a material relatively stiff and non-elastic as compared to the usual elastomeric inner tube stock of flexible hose lines, insufficient pressure is developed to provide an initial seal between the inner tube end 28 and the sleeve 26 unless some provision is made to obtain the necessary contiguous association between the fluid pressure actuated lip seal portion 28 and the inner surface of the embracing sleeve 26. At the same time it is desirous that this contiguous relationship between the sealing surfaces be obtained without sacrificing the advantages connected with a detachable, reuseable type of fitting which may be manually assembled without the use of special assembly tools. To this end in connection with the example being described, the outside diameter of the inner tube 14 is approximately .281", the inside diameter of the bore is approximately .187" and the outside of the nipple 24 is approximately .207". Thus the tube 14 will have its normal inside diameter of approximately .187" expanded an amount approximately .020" at the time the nipple 24 is manually inserted into the inner tube 14. The sleeve 26, where it embraces the terminal end 28 of the inner tube 14 has a main inside diameter of approximately .280" with the inside diameter of the annular sharp cornered ribs 42 approximating .268" which is in the order of .012" less than the expanded outer diameter of the inner tube 14. With existing manufacturing tolerances, in practice the amount of squeeze or compression exerted by the ribs 42 upon the tube 14 will be in the order of .008" to .013". This amount of squeeze permits the sleeve 26 to be manually applied to the end of the inner tube 14 and thereafter the manual insertion of the nipple 24 into the bore of the hose 12 may take place with the sleeve 26 embracing the inner tube 14 as shown in FIG. 2 and with the ribs 42 deforming the inner tube 20 as indicated. The relationship of the ribs 42 with reference to the material of the lip seal portion 28 is such as to prevent any appreciable flow of fluid between the ribs 42 and the deformed body of the inner tube and to an extent which enables the fluid pressure within the inner tube 14 and between the inner tube 14 and the outer surface of the nipple 24 to build up the necessary pressure along the inner surface of the tube 14 to force the annular sealing lip portion 28 embraced by the sleeve 26 into sealing relation with the inside wall of the sleeve 26. Under conditions of vacuum the lip seal portion 28 will seal along the outer surface of the nipple 24. In practice the inside diameter of the socket 20 at 44 will approximate the outside diameter of the wire braid 16 to produce at 44 a compression area to provide low pressure and vacuum sealing at this point.

To prevent deformation of the sleeve 26 during the final assembly of the socket 20 on the nipple 24, the sleeve 26 has been provided with a long taper and the male taper of the sleeve 26 at 46 can be made greater than the female taper of the socket 20 at 48. This difference in taper also acts to force the shoulder 34 of the sleeve 26 into metal-to-metal sealing relation with the conical surface 36 of the nipple 24. Where the forces of assembly directed against the nipple 26 are sufficiently great to cause deformation of the conical surface 36 when the shoulder 34 of the sleeve 26 is rounded, it may become desirable to have the surface 34 more complementary to the surface 36 so as to distribute the loading of the metal-to-metal seal between the nipple 24 and the sleeve 26 over a greater area.

To appreciate the present invention it must be understood that the contiguous relationship between the lip seal portion 28 of the inner tube 14 and the inner surface of the sleeve 26 is that required only to provide an initial seal enabling the fluid pressure in the inner tube 20 and between the outer surface of the nipple 26 and the inner surface of the portion 28 to urge the portion 28 radially outward to actuate the outer wall of the portion 28 into fluid sealing relation with the inner wall of the sleeve 26 and to provide relatively high unit compression at the areas of the ribs 42 without sacrificing manual assembly. Two ribs 42 are shown because we feel that it is a preferred arrangement. However, a single rib 42 is capable of giving satisfactory performance depending upon the characteristics of the inner tube material.

It should also be understood in order to distinguish the present invention over that of Patent No. 2,463,293 that the amount of compression to which the lip seal portion 28 is subjected as a result of the initial assembly of the inner tube 14 with the sleeve 26 and nipple 24 is of a minor magnitude as compared to the compression developed in the final assembly of socket 20 upon the nipple 24 and to which the wire braid 16 is subjected. The sleeve 26 is constructed to protect the lip seal portion 28 from the high compression forces of final assembly in distinction to the disclosure of said patent. It is because of this fact that the nipple 24, upon loosening of the socket 20, may be readily rotated within the bore of the inner tube 14. After the initial assembly, the forces of assembly required to bring at least an annular portion of the lip seal portion 28 into contiguous relationship with at least an annular portion of the sleeve 26, need not be sustaining compressive forces. It is for this reason that the present invention makes it possible for the first time to provide an end fitting having optimum performance capacity with hose having an inner tube of deformable material of the class of elastomers and plastomers which are incapable of sustaining forces of compression of fluid sealing magnitude under pressures for which the assembly is designed under conditions of use and ageing experienced in actual service.

A modification of the disclosure of FIGS. 1 to 3 is shown in FIG. 4 wherein the ribs 42 of the sleeve 26 have been omitted. As shown, the sleeve 26' has a smooth inner wall. The necessary compression of the lip seal portion 28 has been accomplished by the expansion of the bore of the inner tube 14 at the time of insertion of the nipple 24 and before the socket 20 has complete assembly with the nipple 24 to develop the compressive forces of final assembly in the fitting.

The form of the invention of FIG. 5 is as described with reference to FIGS. 1 to 3 except the nipple 24 has been slightly modified. As illustrated the nipple 24' has a rib 24" corresponding to the ribs 42. This is to assure sealing under vacuum and may be found necessary with some inner tube stocks.

What we claim is:
1. The method of assembling a flexible hose having an inner tube and an outer reinforcing layer to a detachable, reuseable end fitting having a body portion, a sleeve and a socket, said inner tube being of a predetermined plastic material, said method comprising the steps of inserting said sleeve between said outer reinforcing layer and an annular lip seal portion of said inner tube, providing a nipple on said body portion having a larger outer diameter than the inner diameter of said lip seal portion by an amount so as to control the degree of expansion of said lip seal into contiguous relationship with said sleeve, inserting said nipple into said lip seal portion of said inner tube to thereby form a joint that is incapable of sustaining forces of compression of fluid sealing magnitude under pressures for which the assembly is designed under conditions of use and ageing experienced in service, whereby said lip seal portion is relatively free from compressive forces along the outer surface of said nipple to permit fluid pressure to actuate said lip seal portion radially outward toward the inner surface of said sleeve and into fluid pressure sealing relation therewith, and securing said socket and outer reinforcing layer of said hose to said body portion without applying any compressive forces to said lip seal portion.

2. The method of assembling a flexible hose having an inner tube of tetrafluoroethylene resin covered by metallic braided wire to a detachable, reuseable end fitting having a body portion, a sleeve and a socket, said method comprising the steps of inserting said sleeve between said braided wire and an annular lip seal portion of said inner tube, providing a nipple on said body portion having a larger outer diameter than the inner diameter of said lip seal portion by an amount so as to control the degree of expansion of said lip seal into contiguous relationship with said sleeve, inserting said nipple into said lip seal portion of said inner tube to thereby form a joint that is incapable of sustaining forces of compression of fluid sealing magnitude under pressures for which the assembly is designed under conditions of use and ageing experienced in service, whereby said lip seal portion is relatively free from compressive forces along the outer surface of said nipple to permit fluid pressure to actuate said lip seal portion radially outward toward the inner surface of said sleeve and into fluid pressure sealing relation therewith, and securing said socket and braided wire to said body portion without applying any compressive forces to said lip seal portion.

References Cited in the file of this patent

UNITED STATES PATENTS

| | | |
|---|---|---|
| 2,258,919 | Wallace | Oct. 14, 1941 |
| 2,333,349 | Weatherhead et al. | Nov. 2, 1943 |
| 2,731,279 | Main | Jan. 17, 1956 |
| 2,427,685 | Midtlyng et al. | Sept. 23, 1957 |
| 2,809,056 | Kaiser | Oct. 18, 1957 |
| 2,833,567 | Bacher et al. | May 6, 1958 |
| 2,853,319 | Press | Sept. 23, 1958 |